No. 653,881. Patented July 17, 1900.
A. POLLAK.
MIRROR INDICATOR FOR AMPLIFYING MOVEMENTS OF BODIES.
(Application filed Dec. 18, 1899.)

(No Model.)

INVENTOR:
Anton Pollak,

By Attorneys,

WITNESSES:

UNITED STATES PATENT OFFICE.

ANTON POLLAK, OF BUDA-PESTH, AUSTRIA-HUNGARY.

MIRROR-INDICATOR FOR AMPLIFYING MOVEMENTS OF BODIES.

SPECIFICATION forming part of Letters Patent No. 653,881, dated July 17, 1900.

Original application filed February 17, 1899, Serial No. 705,771. Divided and this application filed December 18, 1899. Serial No. 740,638. (No model.)

*To all whom it may concern:*

Be it known that I, ANTON POLLAK, a citizen of Hungary, residing at Buda-Pesth, in the Empire of Austria-Hungary, have invented certain new and useful Improvements in Mirror-Indicators for Amplifying the Movements of Bodies, of which the following is a specification.

This application is a division of my application filed February 17, 1899, Serial No. 705,771.

This invention relates to mirror apparatus for indicating the movements of bodies. Such apparatus are applicable for indicating or recording the degree or frequency of movements of bodies, such as vibratory movements or otherwise, and are especially useful where such movements are so minute as to be imperceptible or incapable of determination by ordinary means. In such mirror apparatus a mirror is connected to the body whose movements are to be indicated and a ray or beam of light is thrown upon the mirror and thence reflected upon a suitable screen, so that the deflections of the mirror are indicated upon the screen by movements of the ray or point of light thereon, these movements being greatly amplified, so as to be readily observed or measured. If the movements are rapid, it is common to record them photographically upon a moving photosensitive surface.

My invention provides an improvd meanse for mounting the mirror, whereby it may oscillate with the utmost freedom and exactness around a pivotal edge, to which it is securely held. To this end I mount the mirror upon a pivotal knife-edge and arrange it in connection with a magnetic field, by which it is held magnetically in contact with such pivotal edge. I also provide a pivotal edge or point through which the movements of the moving body are communicated to the mirror and utilize the magnetic field for retaining the mirror in contact also with this moving point.

My invention is especially applicable for recording extremely-rapid movements—as, for instance, those of a rapidly-vibrating body, such as a telephone-diaphragm—and hence is of great importance in those systems of facsimile telegraphy or rapid telegraphy in which rapidly-oscillating parts are employed for varying a ray of light.

Figure 1:
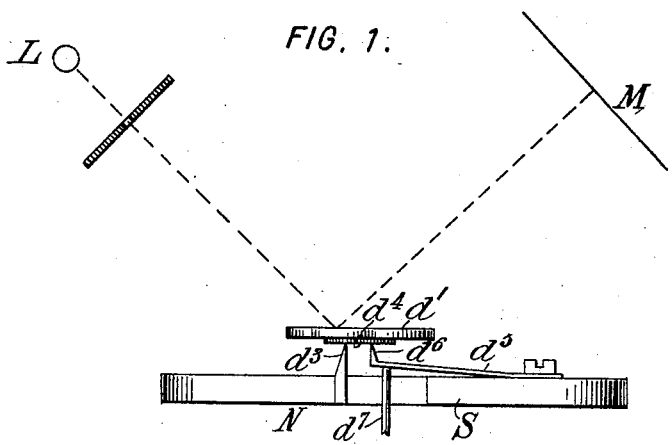
Figure 2:
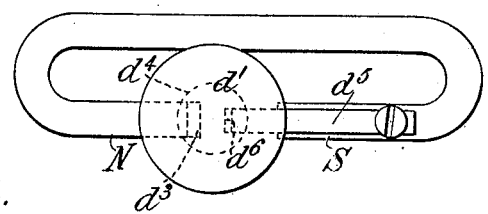
Figure 5:
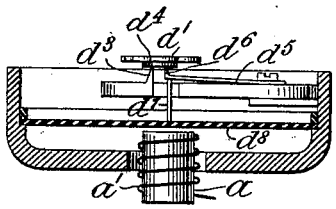
Figure 6:
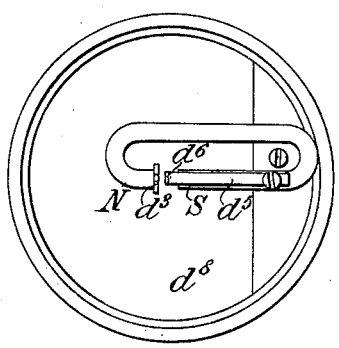
Figure 3:
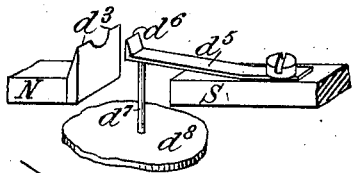
Figure 4:
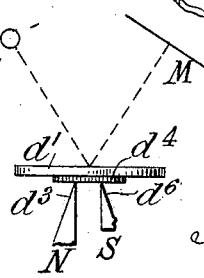

Referring to the drawings, in which I have shown the preferred form of my device, Figure 1 is a side elevation. Fig. 2 is a plan view. Fig. 3 is a fragmentary perspective view showing in detail my invention as applied to a movable diaphragm, the mirror being removed. Fig. 4 is a simple diagram illustrating the principle of my invention. Fig. 5 is a vertical mid-section of my invention as applied to a telephone-diaphragm, and Fig. 6 is a plan piew of Fig. 5 with the mirror removed.

I will first explain the principal of my invention with reference to the diagram Fig. 4. In this diagram $d'$ designates the mirror, and $d^4$ a plate of magnetic material, as iron or steel, upon which the mirror is formed and which is supported upon two knife-edges $d^3$ and $d^6$, with which it is held in contact magnetically. To this end a magnetic field is provided which includes the plate $d^4$. This may be accomplished by forming the knife-edges as opposite poles of a magnet, as indicated by the letters N S. Obviously any relative movement of the knife-edge supports will result in a tilting or oscillation of the plate and mirror, and hence in the deflection of a beam or ray of light emanating from a source L and reflected upon a screen M. For example, the knife-edge $d^3$ may be the pivotal support and the knife-edge $d^6$ may constitute or be connected to the movable body whose movements are to be indicated and multiplied by deflection of the ray of light.

The means of pivotally mounting the mirror and connecting it to the moving body provided by my invention have the advantage that extremely-sharp pivotal edges or points may be applied, so that the movements of the mirror shall occur with the utmost accuracy, the pivotal connection being firm and free from looseness or lost motion and practically frictionless.

A practical embodiment of my invention is shown in Figs. 1, 2, and 3, where the letters N S designate a magnet, which may be a permanent magnet bent to the form shown, so that the poles lie in proximity to each other.

One of the poles—for example, N—carries the sharp projecting edges $d^3$, which form bearing-points for the mirror. The pivotal edge or point $d^6$ is formed on a delicate spring $d^5$, which is fixed to the other pole S in any suitable manner, as by a screw, as shown. To the back of the mirror is fixed a small iron plate $d^4$, which is held by magnetic attraction firmly in position upon the points $d^3$ and $d^6$. The fixed points $d^3$ form the axis of rotation of the mirror when the latter is moved by the point $d^6$. L is a source of light which projects a ray upon the mirror $d'$, as shown in Fig. 1, the mirror reflecting the light thus projected in accordance with its position. The mirror may be concave, so as to focus the light to a point, although this is not essential. The spring $d^5$ is connected to the body the movements of which are to be indicated, which body is shown as a slender rod $d^7$.

In Fig. 3 I have shown my invention as applied for the purpose of recording the vibrations of a diaphragm $d^8$, the rod $d^7$ being either connected to or resting upon the diaphragm. If the diaphragm be set in vibration and its movements recorded by a sensitive screen, the record will show a wavy line corresponding to the movements of the diaphragm.

One application of my invention is for recording the movements of a telephone-diaphragm. Thus applied my invention forms an oscillometer capable of use in a telautograph or recording telegraph system for deflecting a beam of light, the deflections of which may be recorded photographically. Such a telephonic oscillometer is shown in Figs. 5 and 6, where $d^8$ designates the diaphragm, $a$ being the magnet-core and $a'$ its coils.

In order that in spite of the extremely-small vibrations of the telephone-diaphragm the movements of the mirror $d'$ may be sufficiently great, the points of rotation of the same must lie very close together. This ordinarily involves practical difficulties which are overcome by my invention, whereby the desired result is easily attained. On one pole of a suitable bent magnet N S, arranged above the telephone-diaphragm, two small sharp edges $d^3$ are formed, which form the axis of rotation of the mirror $d'$, a small iron plate $d^4$ being fixed below the mirror, which plate, in consequence of magnetic attraction, holds the mirror firmly on the sharp edges $d^3$ and also rests on the upturned end $d^6$ of a steel spring $d^5$, fixed on the other pole of the magnet, which spring is connected with the telephone-diaphragm $d^8$ by means of a bar $d^7$. By this arrangement the points of rotation of the mirror may be shifted suitably close together without fear of the mirror falling down.

What I claim is—

1. A mirror device for indicating the movements of a body, comprising a mirror, points upon which it may oscillate, and means for generating a magnetic field adapted to hold it magnetically against such points.

2. A mirror device for indicating the movements of a body, comprising a mirror, supporting-points upon which it may oscillate, a point moved by said body, and magnetic means for holding the mirror against such points.

3. A mirror device for indicating the movements of a body, comprising a magnetizable plate carrying a mirror, relatively-movable supporting-points, and a magnet adapted to attract said plate against said points, whereby the mirror is oscillated by relative movements of said points.

4. A mirror device for indicating the movements of a body, comprising a magnet, carrying a projecting point, and a mirror held upon such point by magnetic attraction.

5. A mirror device for indicating the movements of a body, comprising a magnet, a projecting point fixed at one pole thereof, a spring fixed to the other pole thereof, and carrying a projecting point, and a mirror held upon such points by attraction of said magnet.

6. The combination with a vibrating diaphragm, of a mirror, supporting-points upon which it may oscillate, a connection between said mirror and diaphragm, and means for generating a magnetic field to hold the mirror against said points by magnetic attraction.

7. The combination with a vibrating diaphragm, of a mirror, a magnetizable plate carrying it, a magnet having projecting points forming a pivotal support for said plate, a spring having a point engaging said plate, the plate being held against said points by the attraction of said magnet, and a rod connecting the diaphragm with said spring, communicating the vibrations of the diaphragm to the point of said spring to oscillate the mirror.

In witness whereof I have hereunto signed my name in the presence of two subscribing witnesses.

ANTON POLLAK.

Witnesses:
  EUGENE V. MYERS,
  FRED WHITE.